July 28, 1931.                 H. DINNER                1,816,366
           FOUR-STROKE INTERNAL COMBUSTION ENGINE WITH
                  AIRLESS INJECTION OF THE FUEL
                       Filed March 18, 1929

INVENTOR:
Heinrich Dinner
BY
Pennie, Davis, Marvin & Edmonds
ATTORNEY.

Patented July 28, 1931

1,816,366

UNITED STATES PATENT OFFICE

HEINRICH DINNER, OF ENNENDA, SWITZERLAND, ASSIGNOR TO THE FIRM: SULZER FRÈRES SOCIÉTÉ ANONYME, OF WINTERTHUR, SWITZERLAND

FOUR-STROKE INTERNAL COMBUSTION ENGINE WITH AIRLESS INJECTION OF THE FUEL

Application filed March 18, 1929, Serial No. 347,778, and in Switzerland March 21, 1928.

The invention relates to four-stroke internal combustion engines with airless injection of the fuel and has for its object to provide an engine in which the fuel is more efficiently admitted and ignited.

According to this invention the air is admitted on the opposite side of the cylinder to the exhaust in the form of a strip-like stream. Preferably the stream, after the exhaust valve has been closed, is heated by passing over the hot walls of the cylinder, thus facilitating ignition of the fuel, and the air further causes the fuel to eddy in an axial direction. The admission of the air in the form of a strip-like stream may be effected by forming the inlet port as a relatively narrow slit, or two or more inlet openings may be provided so that the cross-sectional area of the inlet is split up to produce a strip-like stream. When two or more inlet openings are used the exhaust takes place through a single outlet port.

Figure 1:
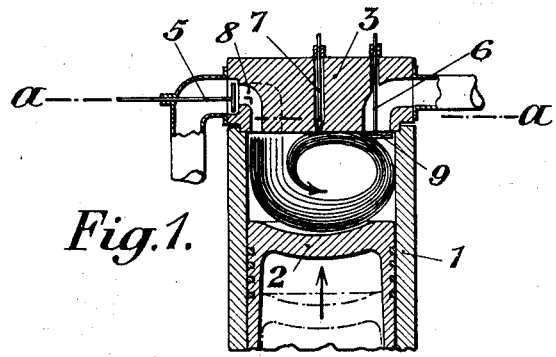
Figure 2:
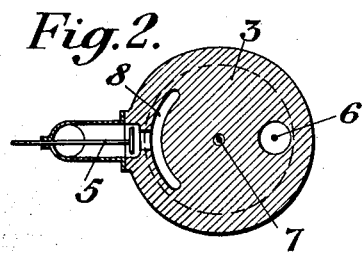
Figure 3:
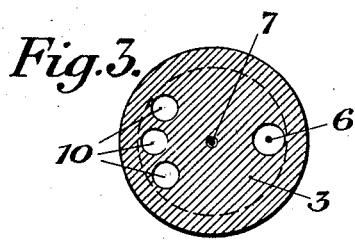
Figure 4:
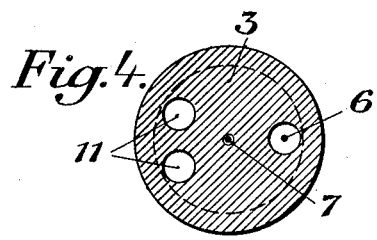

Some constructions embodying the present invention are diagrammatically illustrated in the accompanying drawings, in which Figure 1 shows a section through the cylinder of an internal combustion engine, Figure 2 is a section on the line *a—a* of Figure 1, and Figures 3 and 4 show in section two alternative constructions.

In the construction shown, the cylinder 1 of an internal combustion engine working with airless injection of the fuel, has a piston 2 (the lower dead centre position of which is indicated by dotted lines), and a cylinder cover 3. The inlet valve 5 is arranged opposite the exhaust valve 6, and the fuel valve 7 is mounted in the centre of the cylinder cover in the known manner.

According to the invention the air is caused to flow into the cylinder close to the cylinder wall in a stream of relatively narrow dimensions. This is effected, as can be seen from Figures 1 and 2, by forming the inlet opening as a narrow slit 8 out of which the air flows along the wall of the cylinder 1. The stream then flows over hot walls of the cylinder and the heated exhaust valve 9 so that the fuel, at the moment of its injection, enters a zone of specially heated air and a rapid ignition is assured.

In Figure 3 a modified construction is shown in which the air is admitted to the cylinder in a relatively narrow jet through three circular ports 10 of small diameter, the waste gases as before escaping through a single exhaust port 6. The admission of the pure air may, however, as shown in Figure 4, take place solely through two suitably formed inlet ports 11 and the discharge of the products of combustion may be effected through a single port 6.

If the admission of the pure air is effected through several ports, these may be controlled either by a common valve, or each port may be provided with a separate valve.

What I claim is:

1. In a four-stroke internal combustion engine with airless fuel injection in combination a cylinder, a piston reciprocating in said cylinder, a cover closing one end of said cylinder, a fuel inlet valve centrally arranged in said cover, an exhaust valve arranged in said cover near the periphery and an air inlet valve arranged opposite to said exhaust valve in said cylinder cover, the cross-sectional area of said air inlet being subdivided into several openings, thereby admitting the air in a strip-like stream the central portion of which is heated by passing over the closed hot exhaust valve and the heated area surrounding it, thus facilitating ignition of the fuel, the air further causing the fuel to eddy in an axial direction.

2. In a four-stroke internal combustion engine with airless fuel injection in combination a cylinder, a piston reciprocating in said cylinder, a cover closing one end of said cylinder, a fuel inlet valve centrally arranged in said cover, an exhaust valve arranged in said cover near the periphery and an air inlet valve arranged opposite to said exhaust valve in said cylinder cover, the cross-sectional area of said air inlet being subdivided into at least two openings, thereby admitting the air in a strip-like stream the central portion of which is heated by passing over the closed hot exhaust valve and the heated area surrounding it, thus facilitating ignition of the fuel, the air further causing the fuel to eddy in an axial direction.

3. In a four-stroke internal combustion engine with airless fuel injection, the combination of a cylinder, a piston reciprocating in said cylinder, a cover closing one end of said cylinder, a fuel inlet valve centrally arranged in said cover, an exhaust valve arranged in said cover near the periphery thereof, and an air inlet valve arranged in said cover opposite to said exhaust valve, said inlet valve being adapted to admit air in a strip-like stream and to direct said stream over the hot walls of said cylinder, thereby facilitaing ignition of the fuel and causing the fuel to eddy in an axial direction.

4. In a four-stroke internal combustion engine with airless fuel injection, the combination of a cylinder, a piston reciprocating in said cylinder, a cover closing one end of said cylinder, a fuel inlet valve centrally arranged in said cover, an exhaust valve arranged in said cover near the periphery thereof, and an air inlet valve arranged in said cover opposite to said exhaust valve, said inlet valve having an inlet port formed as a relatively narrow slit adapted to admit air in a strip-like stream and to direct said stream over the hot walls of said cylinder, thereby facilitating ignition of the fuel and causing the fuel to eddy in an axial direction.

In testimony whereof I have affixed my signature.

HEINRICH DINNER.